May 2, 1939.  F. H. COLE  2,156,663
SWITCHING MECHANISM
Filed May 25, 1936  3 Sheets-Sheet 1

INVENTOR
FRED H. COLE
By

ATTORNEY.

May 2, 1939.  F. H. COLE  2,156,663

SWITCHING MECHANISM

Filed May 25, 1936   3 Sheets-Sheet 2

INVENTOR
FRED H. COLE
BY
Fred H. Harris
ATTORNEY.

May 2, 1939.  F. H. COLE  2,156,663

SWITCHING MECHANISM

Filed May 25, 1936  3 Sheets—Sheet 3

INVENTOR
FRED H. COLE
BY
ATTORNEY.

Patented May 2, 1939

2,156,663

UNITED STATES PATENT OFFICE 2,156,663

SWITCHING MECHANISM

Fred H. Cole, Glendale, Calif., assignor, by mesne assignments, to General Electric Company, a corporation of New York Application May 25, 1936, Serial No. 81,662

26 Claims. (Cl. 200—150)

My invention relates to a novel method and apparatus for interrupting an electric circuit, and more particularly to a novel circuit breaker for interrupting high-voltage electric circuits.

Many of the features of the present invention are particularly applicable to circuit breakers of the oil-blast type in which a stream of dielectric liquid, such as circuit breaker or transformer oil, is forced into an arc-containing gap between two separating contacts. Such a flow of dielectric liquid may be induced either by use of a pressure-building plunger acting on the dielectric liquid, or by use of other contacts of the system between which an arc is formed to vaporize a portion of the dielectric liquid, thus supplying the impelling force.

My experiments indicate that most existing circuit breakers of the oil-blast type are in effect operating on a gas-blast principle. When the interrupting contacts first separate, an arc is drawn therebetween which vaporizes the adjacent oil and forms an expanding gas bubble, the arc then persisting through the gas as distinct from continuance at a position outside the gas bubble and thus in the dielectric liquid. Most existing oil-blast systems merely act to force into the widening gap a new supply of dielectric liquid in such a manner as to merely displace the gas bubble to one side of the gap axis, the arc continuing through the deformed and displaced gas bubble rather than being forced into, or forced to move through, the dielectric liquid.

It is an object of the present invention to provide a circuit breaker of the oil-blast type which will force the arc to move into and through the dielectric liquid, as distinct from permitting it to continue through a gas bubble containing ionized gas. This cools the arc much faster than is possible with a gas-blast type, and consequently dissipates energy at a greater rate, thereby insuring quicker and better-controlled interruption of the circuit.

If a pair of generating contacts is utilized to induce the localized high pressure forming the stream of dielectric liquid which moves into the gap between the interrupting contacts, it is possible to design the system to quench the arc immediately after it is formed. However, such a procedure may build up very high recovery or transient voltages which, due to their steep wave front, tend to pierce insulation and injure the generating or transmission equipment. I have found it desirable to delay arc interruption between the interrupting contacts until approximately the end of a half-cycle, i. e. to interrupt the circuit when the current wave is approximately zero in an alternating-current system, and it is an object of the present invention to provide such a system.

One manner of preventing circuit interruption within the half cycle, and delaying this interruption until the end of the half cycle, is to utilize a prolonged flow of dielectric liquid into the gap, as distinct from using a sudden and very short surge of dielectric liquid.

It is an object of the present invention to provide, in circuit breakers utilizing an arc-generated oil-blast, a system for prolonging the time of oil flow until a point near the point of zero current has been reached.

Another object of the invention is to jet successively streams of dielectric liquid into the widening and arc-containing gap between two switch contacts.

One manner of securing a prolonged flow in a circuit breaker in which the flow is induced by arcing between a set of generating contacts is to feed successively to the arc therebetween additional quantities of dielectric liquid to be vaporized, and it is an object of the present invention to provide such a system.

Another object of the invention is to provide a series of pockets adjacent the widening gap between a set of generating contacts so that the arc is drawn adjacent these pockets in succession to supply to the arc additional quantities of dielectric liquid.

Regardless of whether one or more streams of dielectric liquid are forced into the gap between the interrupting contacts, it is an object of the present invention to throttle such flow in a novel manner.

Another object of the invention is to form a switch which will very efficiently and effectively break the circuit regardless of whether the current flow is relatively low or relatively high.

Another object of the invention is to provide a plurality of baffles extending between the generating and interrupting contacts to form passages conducting dielectric liquid to the gap between the interrupting contacts. The provision of a novel baffle structure forming such passages is also included among the objects of this invention.

Another object of the invention is to correlate the movement of the generating and interrupting contacts relative to such baffles so that when the generating contact uncovers a given passage a flow of dielectric liquid may take place through this passage, reaching the interrupting contacts just after this passage has been cleared thereby.

I have found that superior results can be obtained if the pressure adjacent the generating contact is momentarily increased just prior to separation of these contacts. The arc will thus form in a dielectric liquid of high pressure, and the gas bubble formed between the generating contacts will consequently be confined, thereby vaporizing a greater quantity of dielectric liquid than would be possible if the gas bubble was permitted to freely expand. It is an object of the present invention to provide such a system, and, if two sets of interrupting contacts are utilized, to position the generating contacts therebetween and open the interrupting contacts slightly ahead of the generating contacts.

Another object of the invention is to hold the arc mechanically in the general vicinity of the interrupting contacts, and preferably to force this arc into a narrow slot, thus making it much more difficult for the arc to persist.

Another object of the invention is to force the arc against an arc-dividing edge by use of a stream of dielectric liquid. If the arc is to persist, it must flow through an elongated path on opposite sides of such an arc-dividing edge. Both the elongation of the arc and the effectiveness of the oil-blast under these circumstances facilitates interruption or breaking of the arc.

Another object of the invention is to provide a novel operating system for moving the generating and interrupting contacts.

Further objects and advantages of the invention will be made evident to those skilled in the art from the following description of two embodiments of the invention.

Referring to the drawings.

Figures 1, 2, 3, 4, 5:
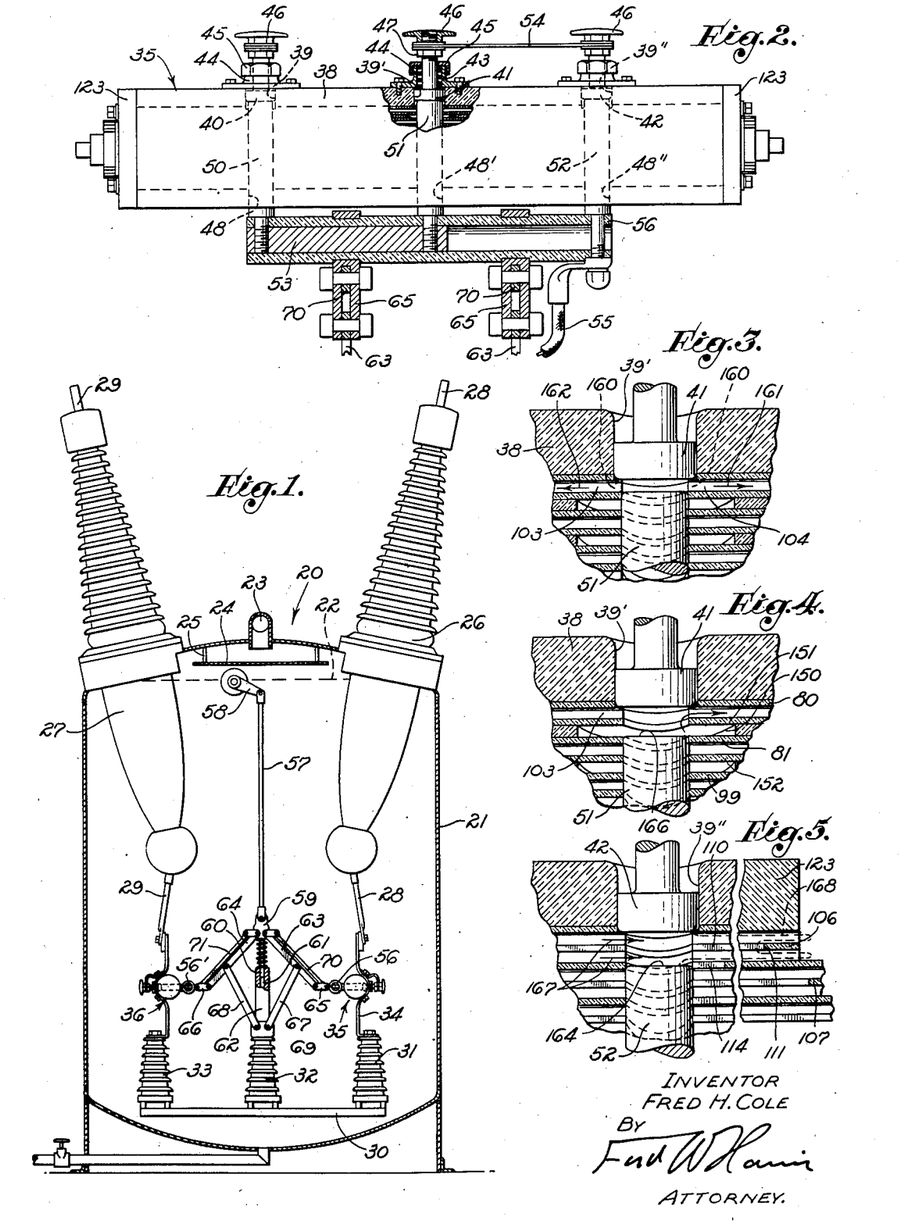
Fig. 1 illustrates in section a complete tank-type circuit breaker incorporating the features of the invention.
Fig. 2 is a top or plan view partly in section of one of the arc-extinguishing structures shown in Fig. 1.
Figs. 3 and 4 are fragmentary views illustrating successive positions of the generating contacts during opening of the circuit breaker.
Fig. 5 illustrates the position of the interrupting contacts when the generating contacts assume the position shown in Fig. 4.

Referring particularly to Fig. 1, I have shown one type of circuit breaker 20 including a tank 21 filled with an arc-extinguishing liquid such as circuit breaker or transformer oil or other dielectric liquid to a level indicated by the numeral 22. The upper end of the tank is suitably vented through a pipe 23 beneath which a baffle 24 is suspended by arms 25. The usual bushings 26 and 27 extend through the upper end of the tank 21 and carry conductors 28 and 29 connected in the circuit to be interrupted.

A frame 30 in the lower end of the tank 21 supports insulators 31, 32, and 33. An arm 34 extends upward from the insulator 31 to the conductor 28 and supports an arc-extinguishing structure 35 of the invention. Another arc-extinguishing structure 36 is similarly supported between the insulator 33 and the conductor 29. As the arc-extinguishing structures 35 and 36 are designed along similar principles, it will be necessary to consider the constructional details of only one of these structures. Figs. 2 to 12 disclose these details with reference to the arc-extinguishing structure 35.

Fig. 2 is a top view of this arc-extinguishing structure 35, from which it will be apparent that this structure in general includes a tube 38 formed of insulating material and extending horizontally to form an enclosing or surrounding structure for the switch contacts. In the embodiment shown the tube 38 provides three openings 39, 39', and 39'', respectively, retaining primary contacts 40, 41, and 42. If desired, these contacts may be biased to move toward the center of the tube 38 by compression springs 43 surrounding smaller-diameter portions of the three contacts and being retained in sockets 44 closed by caps 45. The smaller-diameter portion of each contact may be threaded to receive a knob 46 and a lock-nut 47.

Extending through diametrically disposed openings 48, 48', and 48'' of the tube 38 are coacting secondary or movable contacts 50, 51, and 52, respectively, separable with respect to the contacts 40, 41, and 42. The contacts 41 and 51 form a generating set of contacts. The contacts 42 and 52 form a set of interrupting contacts, as do also the contacts 40 and 50.

When these sets of contacts are in closed position, shown in Fig. 2, current traverses the same in series. Thus, current may flow through the conductor 28, through the contacts 40 and 50 and thence through a conducting link 53 connecting the contacts 50 and 51. This circuit is continued from the contact 51 through the contact 41 and thence through a jumper 54 to the contact 42. This current then flows through the contact 52 and through a conductor 55 leading to one of the end contacts of the arc-extinguishing structure 36. The current flows through the three corresponding sets of contacts therein in a manner similar to that just described with reference to the arc-extinguishing structure 35, and thence through the conductor 29.

It is desirable to substantially simultaneously move the contacts 50, 51, and 52 when the circuit is to be interrupted. In accomplishing this I provide a tube of insulating material 56 to which the contact 52 is directly mounted. The conducting link 53 fits inside this tube and portions of the contacts 50 and 51 may be pressed into corresponding openings thereof. The contacts 50, 51, and 52 will thus move as a unit with the tube 56.

In the embodiment shown this tube 56 of each arc-quenching structure is moved in a horizontal plane, the tubes being moved toward each other when it is desired to interrupt the circuit. This is accomplished by an operating mechanism imparting straight-line motion to the tubes. As best shown in Fig. 1, such an operating mechanism may include a rod 57 pivoted to a crank 58 turned by some actuating means, well known and not shown, when it is desired to open or close the circuit breaker. The lower end of the rod 57 is pivoted to a head 59 from which a pin 60 depends, this pin extending into a cavity 61 of a tube 62 supported by the insulator 32. Arms 63 and 64 are pivoted at their upper ends to the head 59 and at their lower ends to links 65 and 66, respectively, secured to the tube 56 and the corresponding tube 56' of the arc-quenching structure 36. Arms 67 and 68 are respectively pivoted at their upper ends to intermediate portions of the arms 63 and 64, and at their lower ends to a head 69 of the tube 62.

To insure straight-line motion of the contacts 50, 51, and 52, guide arms 70 and 71 are provided. The upper ends of these guide arms are pivoted to the head 59 at points horizontally disposed from the axes about which the arms 63 and 64 pivot. The lower ends of the guide arms 70 and 71 are pivoted to the links 65 and 66 at points horizontally disposed from the pivotal axes respectively connecting the arms 63 and 64 to the links 65 and 66.

For purpose of stability it is desirable to use on the right-hand side of the rod 57 two of the members 63, 65, 67, and 70, and to use on the left-hand side of the rod 57 two of the members 64, 66, 68, and 71. Such a construction is indicated in Fig. 2 relative to the members 63, 65, and 70, this figure also indicating the members 65 as surrounding the tube 56 in clamping relationship.

It will thus be clear that the head 59 and the link 65 cooperate with the arms 63 and 70 in forming a parallelogram-like construction which insures that the contacts 50, 51, and 52 will be moved in a horizontal plane when the rod 57 is raised or lowered. The same is true with regard to the structure actuating the contacts of the arc-extinguishing structure 36. While it is not always necessary to use such a straight-line motion, I find this very desirable in view of the manner in which the arc-extinguishing structures 35 and 36 are formed.

Figure 6:
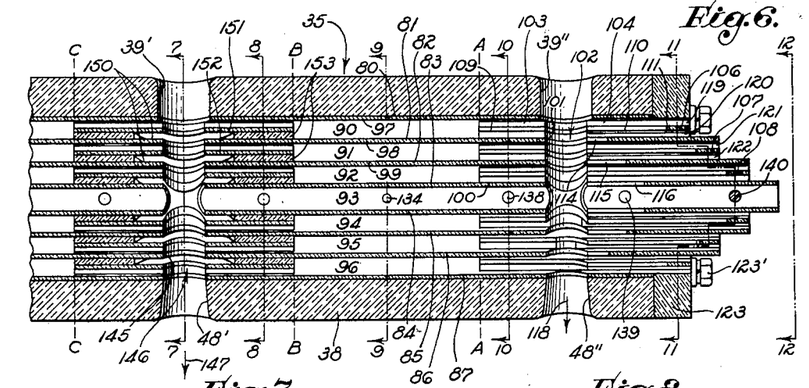
Fig. 6 is a fragmentary horizontal sectional view of a portion of one of the arc-extinguishing structures as shown in Fig. 1.

The constructional details of the arc-extinguishing structure 35 can best be understood by reference to Figs. 6 to 12 inclusive, Fig. 6 showing in detail only the right-hand portion of this arc-extinguishing structure, the left-hand portion being identically constructed. The tube 38 forms a surrounding structure which confines the pressure-generated flow of dielectric liquid during opening of the circuit breaker. The invention comprehends a system for successively jetting dielectric liquid into the widening gap between the interrupting contacts, for instance, between the contacts 42 and 52. Best results accrue if jets or streams of dielectric liquid of different cross-sectional area are provided. For instance, the structure may be designed so that the first jet will fill a relatively small gap between the interrupting contacts, while later jets will be of greater cross-sectional area to fill the widening gap.

In accomplishing these results, I prefer to utilize in the tube 38 means extending adjacent the gap between the interrupting contacts and providing a plurality of longitudinal passages directed toward this gap. A suitable baffle means may be utilized in forming these passages, baffles 80 to 87 being illustrated in this capacity and forming longitudinal passages 90 to 96 inclusive. While flat baffles may be used in this capacity, I prefer to form these longitudinal passages by utilization of concentric tubes spaced from each other to form annular passages suitably closed at certain peripheral portions by blocking or spacing members, as will be hereinafter described.

With such a construction the outer tube 97 will fit snugly in the tube 38 and will form the baffles 80 and 87. The next tube 98 will form the baffles 81 and 86, while the tube 99 will form the baffles 82 and 85. An inner tube 100 forms the baffles 83 and 84 and defines the longitudinal passage 93.

These tubes, and the baffles provided thereby, are drilled to provide openings 101 positioned in alignment with each other so as to form a contact-receiving space 102 in which the movable contact 52 is positioned, the corresponding primary contact 42 being positioned in the opening 39'' thereadjacent and in alignment therewith. That portion of each of the longitudinal passages 90 to 96 which lies immediately to the left of the contact-receiving space 102, and directly communicates therewith, comprises a mouth from which dielectric liquid flows into the widening gap between the contacts 42 and 52. By way of example, the mouth of the longitudinal passage 90 is indicated by the numeral 103. Thus, as the movable contact 52 is only slightly smaller in diameter than the contact-receiving space 102, this contact acts as a valve to clear the mouths of the longitudinal passages successively. As soon as any particular mouth is cleared, means, such as the set of generating contacts, is provided for forcing a stream of dielectric liquid into the gap. The arc formed in this gap will thus be forced to the right in Fig. 6 and into a discharge portion of the longitudinal passage. By way of example, the discharge portion of the longitudinal passage 90 is indicated by the numeral 104.

Extending into the mouth and discharge portion of each longitudinal passage is an auxiliary baffle. These auxiliary baffles extend from the section A—A to the right-hand end of the arc-extinguishing structure 35. In the embodiment illustrated these auxiliary baffles are formed by diametrically-opposite portions of concentric tubes interspaced relative to the tubes 97, 98, 99, and 100. By way of example, the three auxiliary baffles closest to the upper end of Fig. 6 are indicated by the numerals 106, 107, and 108.

Figure 10:
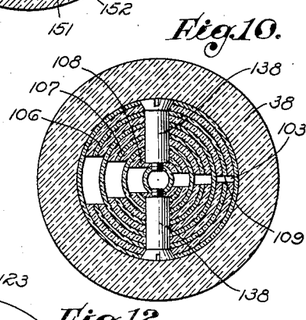

I usually find it preferable to form a slot in that portion of each of the auxiliary baffles which extends into the mouth of the corresponding longitudinal passage. For instance, the auxiliary baffle 106 provides a slot 109 which extends from the left end thereof to the contact-receiving space 102. Similar slots are formed in the other auxiliary baffles in corresponding positions. As best shown in Figs. 6 and 10, these slots may be formed of progressively increasing width to correspond to the distance across the mouths of the passages 90 to 96.

Similarly, I find it preferable to provide an arc-quenching slot in that portion of each auxiliary baffle which extends into the discharge portion of the corresponding longitudinal passage. Each of these slots is preferably rather narrow and extends from the contact-receiving space 102 toward the outer end of the corresponding auxiliary baffle, but terminating short thereof. By way of example, the auxiliary baffle 106 provides a narrow slot 110 opening on the contact-receiving space 102 and extending to a head 111 thereof, this head forming an arc-dividing means for splitting any arc moving rightward in the slot 110 in a manner to be hereinafter described. Similar slots are formed in those portions of the other auxiliary baffles lying in the discharge portions of the respective longitudinal passages. It will be noted, however, that these slots are progressively longer toward the center of the surrounding structure, corresponding to the increased length of the concentric tubes toward this center portion.

It is sometimes desirable to form slots in the tubes 98, 99, and 100, these slots communicating with the contact-receiving space 102 and extending substantially parallel to the slots corresponding to the slot 110. Certain of these slots are respectively indicated by the numerals 114, 115, and 116, corresponding slots being positioned on the opposite side of the axis of the surrounding structure. It will be noted that these slots are of progressively increasing length toward the center of this structure.

Figure 11:
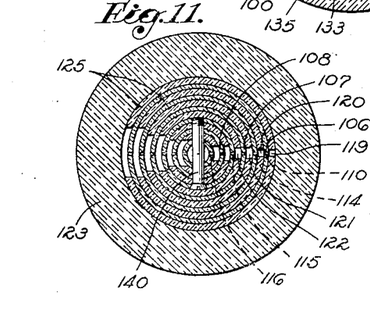
Figure 12:
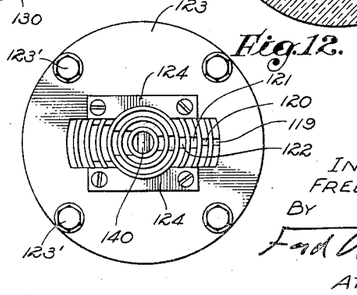
Figure 13:
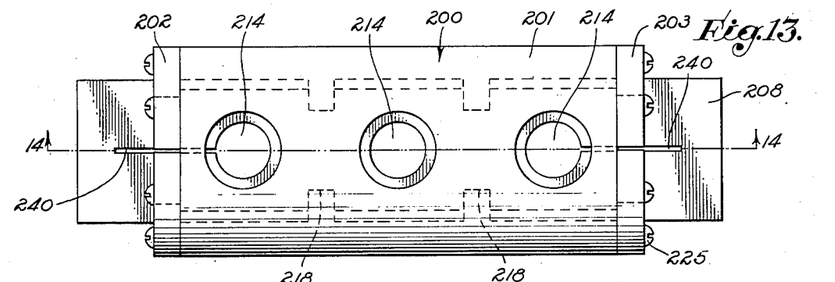
Fig. 13 illustrates a modified form of arc-extinguishing structure.
Figure 14:
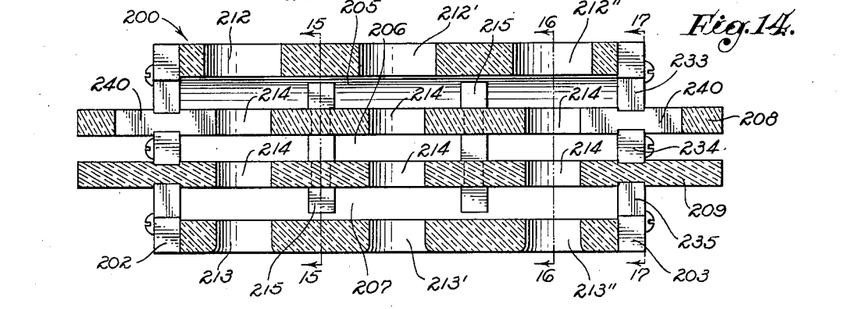
Fig. 14 is a view taken on the line 14—14 of Fig. 13.
Figures 15, 16:
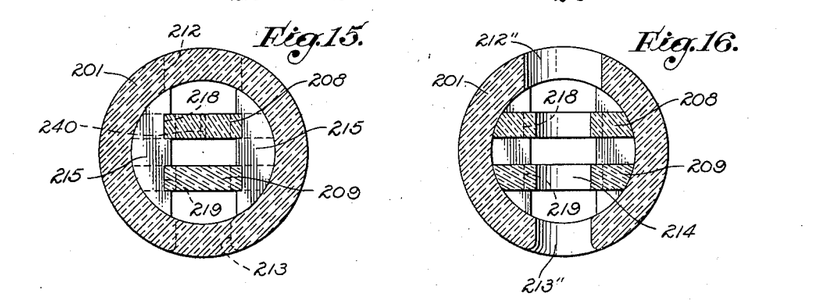
Figs. 15, 16, and 17 are sectional views taken on corresponding lines of Fig. 14.

It will thus be clear that the extreme end of each of the longitudinal passages provides an exit portion from which dielectric liquid or vaporized material may be discharged. I prefer to throttle such a flow at this point and for this reason form the exit portions of smaller cross-sectional area than the main portions of the corresponding longitudinal passages. The auxiliary baffles, and especially the head portions thereof such as indicated by the numeral 111, are also effective in this regard. Further, in the preferred embodiment of the invention I provide exit portions of different cross-sectional area, the cross-sectional area of these exit portions increasing in the direction of the arrow 118 which is also the direction of movement of the movable contact 52. Figs. 11 and 12 best illustrate the progressively increasing area of these exit portions. If the auxiliary baffles are used, each of the longitudinal passages will have two exit portions. By way of example, the longitudinal passage 90 is provided with exit portions 119 and 120 of substantially the same cross-sectional area, while the longitudinal passage 91 is provided with two exit portions 121 and 122 of substantially equal area but each of greater area than the exit portions 119 or 120.

An end member 123 is bolted to the end of the tube 38 by bolts 123' and provides a slot to receive the end portion of the auxiliary baffle 106, and a wider slot to receive the end portion of the auxiliary baffle most removed from the auxiliary baffle 106. The space between these slots is progressively wider to receive the end portions of the intermediate tubes and auxiliary baffles which extend from this widened space, as shown in Fig. 6. Bars 124 are bolted to the end member 123 to better support the ends of these intermediate tubes and auxiliary baffles.

To form these throttling exit portions, and to bound the longitudinal passages, I provide a plurality of blocking members 125. For instance, between the tube 97 and the tube forming the auxiliary baffle 106 is an annular space containing two of the blocking members 125 which extend slightly less than half-way around this passage to form the exit portion 119 at one side of the structure and an exit portion at the other side. Similar blocking members, formed substantially as shown, extend in the other annular spaces to form the other exit portions.

The blocking members 125 and others corresponding thereto extend throughout the discharge portions and the mouths of the longitudinal passages 90 to 96 between the right-hand end of the arc-extinguishing structure 35 and the section A—A. The mouths of the longitudinal passages are thus bounded by the edges of these blocking members, as best shown in Fig. 10. I prefer to make these mouths of progressively increasing cross-sectional area in the direction of the arrow 118, corresponding to the progressively increasing areas of the exit portions. However, in some instances it is desirable to make the mouths slightly larger in area than the corresponding exit portions, though this is not necessarily the case.

Figure 9:
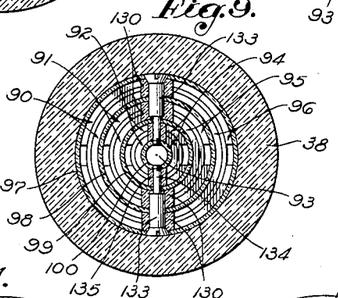

Adapted to properly space the tubes 97, 98, 99, and 100, and to bound the main portions of the longitudinal passages formed thereby, are blocking members 130 best shown in Fig. 9. These blocking members 130 extend between the sections A—A and B—B. Bolts 133 extend through these blocking members and provide heads countersunk in the outer tube 97. These bolts also provide a reduced-diameter portion 134 which extends through blocking members 135 of smaller size than the blocking members 130. The inner ends of these reduced-diameter portions 134 are threadedly received by the inner tube 100. It will thus be clear that these blocking members 130 and 135 divide the annular spaces between the tubes 97, 98, 99, and 100 to form the main and rather large portions of the longitudinal passages.

The various concentric tubes are also supported by bolts 138, best shown in Fig. 10. These bolts provide countersunk heads and a reduced-diameter portion which is threadedly received by the inner tube 100. In a similar manner, bolts 139, shown in Fig. 6, act to support these tubes. In addition, a bolt 140, best shown in Figs. 6 and 11, extends through certain of the innermost tubes in supporting relationship and acts to impede or throttle any flow along the longitudinal passage 93.

In order to secure the desired flow of dielectric liquid through the various longitudinal passages into the widening gap between the interrupting contacts, I provide a suitable means for directing flow of this dielectric liquid through these longitudinal passages in succession. The invention comprehends various means for accomplishing this result of successively jetting streams or jets of dielectric liquid into the widening gap between the interrupting contacts. Many advantages accrue from the use of a set of generating contacts in this regard, and, in the embodiment shown, the generating contacts successively generate pressure impulses acting to direct streams of dielectric liquid along the longitudinal passages in succession. However, it will be clear that various other means accomplishing this result are within the scope of this invention.

As disclosed best in Fig. 6, the concentric tubes 97 to 100 are drilled to provide aligned openings 145 which cooperate in forming a contact-receiving space 146. The movable contact 51 moves along this space in a direction indicated by the arrow 147. It thus acts as a valve means to successively uncover the openings 145 and to draw the arc between the contacts 41 and 51 adjacent successive zones containing dielectric liquid. For instance, when the arc is first formed it will vaporize that portion of the dielectric liquid adjacent the longitudinal passage 90. This produces a rapidly-expanding gas bubble which forces dielectric liquid along this longitudinal passage 90 and into the widening gap between the interrupting contacts, as previously described. When the arc is drawn to a position adjacent the longitudinal passage 91, additional dielectric liquid will be fed to the arc and dielectric liquid will flow along the longitudinal passage 91 into the gap between the interrupting contacts. This feature of progressively feeding additional quantities of dielectric liquid to the arc between the generating contacts is an important feature of the invention for reasons to be hereinafter pointed out.

To better feed the arc between the generating contacts with additional quantities of dielectric liquid, and to serve other valuable functions, I provide a series of pockets 150 disposed along the path traversed by the movable contact 51 during opening of the circuit breaker. These pockets are preferably annular in character to surround the contact-receiving space 146. In the embodiment shown they are formed by intermediate baffles preferably composed of short tubes extending between the sections B—B and C—C. Two of these intermediate baffles are indicated respectively by the numerals 151 and 152. Spacers 153 close the space between each of these intermediate baffles and the next interior tube so as to provide pockets 150 closed on all sides but opening directly upon the contact-receiving space 146.

Figure 7:
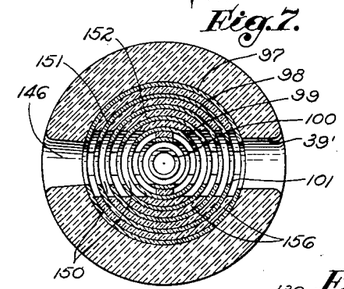
Figs. 7, 8, 9, 10, 11, and 12 are views taken on corresponding lines of Fig. 6.
Figure 8:
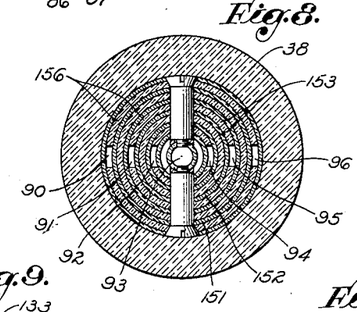

To properly space the tubes 97, 98, 99, and 100, and the intermediate tubes, and to cooperate in defining those portions of the longitudinal passages adjacent the generating set of contacts, I provide a plurality of blocking members 156 best shown in Figs. 7 and 8. These blocking members are arcuate in form to fill the annular spaces between the various tubes and intermediate tubes. They extend slightly less than half way around these annular spaces so as to provide passages adjacent the generating contacts which form a part of the longitudinal passages 90 to 96 inclusive. These blocking members extend from the section B—B to the section C—C.

The left-hand end of the arc-extinguishing structure 35, viewed as in Fig. 6, is constructed the same as the right-hand portion shown. It thus forms adjacent the interrupting set of contacts comprising the contacts 40 and 50, a structure similar to that adjacent the contacts 42 and 52.

In understanding the mode of operation of the present invention, let it momentarily be assumed that none of the tubes are present inside the main tube 38. Now, if previous practice is followed, the movable contacts will either be separated simultaneously from the primary contacts, or the generating set of contacts will be opened slightly ahead of the interrupting set of contacts. In either instance, it will be clear that as soon as the arc forms between the generating contacts, this arc will contact the dielectric liquid and vaporize a portion thereof to form a rapidly-expanding gas bubble. My experiments show that the resulting pressure surge will be of extremely high pressure gradient. Tests indicate that in forming such an arc in oil confined in a tube, such as the tube 38, the pressure may often build up to 1000 lbs./sq. in. in $16/10000$ sec., a pressure gradient of 625,000 lbs./sq. in./sec.

However, the period of duration of this pressure surge is extremely short. This is due to the fact that as soon as the gas bubble forms the arc extends therethrough, and the expanding gas bubble forces the gas-liquid interface away from the arc at such speed that additional quantities of the dielectric liquid are not vaporized to further increase the pressure and permit continuance of building of this extremely high pressure gradient. Thus, in the absence of means for feeding additional dielectric liquid into the arc for vaporization, the pressure surge may last only a few thousandths of a second.

The shortness of such a pressure surge accounts for the deficiency of many oil-blast breakers, for the dielectric liquid is forced toward the interrupting contacts only for an extremely short period of time. The flow of dielectric fluid thus stops long before the point of zero current is reached, unless the circuit breaker happens to trip just before this point of zero current. Such a momentary flow of dielectric liquid into the gap between the interrupting contacts is thus not always effective in wiping the arc from the gap and from these contacts, and filling the gap with dielectric liquid at such rate that the recovery voltage will not again start the arc. Further, the arc between the interrupting contacts will not be materially cooled, and will exist through its own gas bubble without being forced into the adjacent dielectric liquid.

It will be clear that a very definite amount of energy must be dissipated before the arc between the interrupting contacts will be broken. The generator end of the system is continuously feeding energy to the arc, and gas will be generated at a corresponding rate. Cooling of the arc is very effective in dissipating this energy, and my experiments show that such cooling is much more quickly accomplished if a dielectric liquid is introduced into the gap, or if the arc is caused to pass through the dielectric liquid, than would be the case if gas is relied upon for this cooling. There is a certain power rate tending to maintain the arc, and the power rate of introduction of the dielectric liquid must be greater than the power rate maintaining the arc before the arc will be quenched. A watt oscillogram of the arc will show that a very large increase in power is drawn from the source as soon as the arc is subjected to any cooling effect whatsoever. It is impossible to continue the power increase indefinitely if the power absorption rate is continued, and the arc must go out for lack of energy to sustain it as it passes through the non-generating or zero point of the current cycle. It thus becomes important to prolong the introduction of dielectric liquid into the widening gap, and the present invention accomplishes this result in a very desirable manner. Thus, instead of the momentary flow which would be effected in the absence of the inner tubes or baffles of my invention, the structure shown prolongs the time of dielectric introduction, even continuing this introduction to or beyond the zero point of the half cycle in which the arc is formed.

Contrary to the usual practice, I prefer to open the interrupting set of contacts slightly ahead of the opening of the generating set of contacts. This tends to prolong the period of flow of the dielectric liquid toward the interrupting set of contacts regardless of whether or not the internal baffle structure disclosed is utilized. Thus, by properly adjusting the knobs 46 and lock-nuts 47, it is possible to simultaneously separate the contacts 40 and 50, and the contacts 42 and 52, separation thereof taking place at an instant before the contacts 41 and 51 separate. As soon as the contacts 42 and 52 start to separate, an arc is formed which generates a gas bubble. This results in a momentary pressure surge toward the generating set of contacts. A similar pressure surge is simultaneously formed by the contacts 40 and 50. As both of these surges are toward the generating set of contacts 41 and 51, it will be clear that the pressure of the dielectric liquid thereadjacent will be momentarily increased to a very high value. During the existence of this momentary high pressure, the contacts 41 and 51 separate. The greatly-increased pressure prevents free expansion of the gas bubble formed when the arc between the contacts 41 and 51 vaporizes a portion of the dielectric liquid. The arc is thus maintained closer to the gas-liquid boundary, and additional dielectric liquid enters the gap to prolong the period of gas generation. It will be further clear that the arc between the generating set of contacts will generate a higher pressure under these conditions of localized increase in pressure at the time of arc formation therebetween and this increased pressure will act against the arc surface of the movable contact 51 to assist the operating means in opening the circuit breaker. At the instant before the contacts 41 and 51 separate, two force components directed toward these contacts are in existence, but as soon as the arc therebetween generates the high impulse pressure, the dielectric fluid will flow outward toward each set of interrupting contacts at the instant the momentary pressure first begins to die down. This results in a sudden surge of dielectric liquid towards each of the widening gaps between the contacts of the two interrupting sets.

Considering now the mode of operation of the complete device with the various baffles installed in the tube 39, it will be clear that separation of the contacts 42 and 52 will form an arc adjacent the mouth of the longitudinal passage 90. This will cause a pressure surge toward the exit end of this longitudinal passage and also toward the generating set of contacts 41 and 51. As the exit end is of restricted cross-sectional area, any outward flow of dielectric liquid at this point is impeded to further build up the pressure surge moving toward the generating set of contacts. A similar action takes place adjacent the contacts 40 and 50 of the interrupting set. The result is that an extremely high and momentarily-existing pressure is developed in the passage between the baffle 97 and the intermediate baffle 151.

At this instant the generating contacts 41 and 51 start to separate, and an instant later assume the positions shown in Fig. 3. The arc is formed therebetween under these conditions of localized pressure, and a gas bubble is generated, the boundary thereof at one instant being indicated by the dotted lines 160 of Fig. 3. The result is a rightward flow of dielectric liquid along the longitudinal passage 90 as indicated by the arrow 161, and a leftward flow along this longitudinal passage is indicated by the arrow 162. This sudden flow or surge of dielectric liquid indicated by the arrow 161 causes a jetting of dielectric liquid from the mouth 103 directly into the gap between the contacts 42 and 52. At this instant of time the arc surface 164 of the contact 52 lies in the opening of the auxiliary baffle 106. The jet of dielectric liquid thus moves the arc into the discharge portion 104 of the longitudinal passage 90 and toward the exit portion thereof.

The contacts 51 and 52 move at corresponding rates so that at another instant of time these contacts occupy the positions respectively shown in Figs. 4 and 5. During this movement of the contact 51, the arc surface 166 thereof has cleared the opening in the intermediate baffle 151 so that the arc has been drawn therethrough and adjacent the first pocket 150. The dielectric liquid therein is thus vaporized by the arc, at least in part, and a succeeding surge of dielectric liquid takes place along the longitudinal passage 90 to the gap between the contacts 42 and 52. This causes another surge through the mouth 103 into the widening gap, as previously described. In addition, it will be clear that in the meantime the contact 52 has moved into its position shown in Fig. 5 and has cleared the opening of the auxiliary baffle 106 so that the full area of the mouth 103 above and below this auxiliary baffle is now available for jetting dielectric liquid into the gap, as indicated by the arrow 167. This flow of dielectric liquid elongates the arc, moving it into the narrow slot 110 and toward the arc-splitting edge of the head 111. If the arc has not been interrupted, side portions of the arc will be forced outward by this flow of dielectric liquid into paths indicated by the dotted lines 168.

It is much harder for the arc to persist if it is moved into a narrow slot such as the slot 110. Further, this slot mechanically holds the arc, permitting movement thereof only in a direction along the slot and toward the head 111. When the arc is further elongated on opposite sides of this head, it is in a very unstable condition, for the dielectric liquid moving through the exit portion tends to disrupt this arc as it draws the arc outward into the dielectric liquid outside of the arc-quenching structure. It will be apparent that once the arc has moved adjacent the arc-splitting edge of the head 111, it is mechanically held in fixed position—a condition very favorable to extinction.

As the contact 51 continues its movement it clears the passage between the baffle 81 and the intermediate baffle 152, thereby coming into communication with the dielectric liquid in this passage. This further feeds the arc and forces the dielectric liquid rightward in this passage and also in the longitudinal passage 90. In the meantime, the tortuous path of the arc between the contacts 42 and 52 has been further lengthened by movement of the contact 52 to clear one portion of the mouth of the longitudinal passage 91. The rightward movement of the dielectric liquid into the widening gap thus forces the arc rightward into the slot 114 of the baffle 98 and outward into the corresponding exit portion.

Additional movement of the contact 51 will clear the pocket 150 between the intermediate baffle 152 and the baffle 99, thus flowing a surge of dielectric liquid along the longitudinal passage 91. The contact 52 having now completely cleared the mouth of the longitudinal passage 98, this dielectric liquid flows therethrough above and below the auxiliary baffle 107 and directly into the widening gap. This flow further elongates the arc, forcing it into the narrow slot of the auxiliary baffle 107 and against the head thereof, and outward through the exit portions as previously described.

It will be clear that this series of actions is repeated during withdrawal of the contacts 51 and 52 from the contact-receiving spaces 146 and 102. The contact 51 will repeatedly move into the vicinity of a new supply of dielectric liquid, thus resulting in successive surges to the widening gap between the interrupting contacts 42 and 52 along the longitudinal passages as they are successively cleared by the movable contact 52.

It will be further clear that the same action takes place with reference to the interrupting contacts 40 and 50 so that arcs are forced from each end of the arc-extinguishing structure 35. Exactly similar actions take place in the arc-extinguishing structure 36. Whichever arc first breaks will control interruption of the circuit.

By prolonging the flow of dielectric liquid, and by successively jetting such dielectric liquid into the gap between the interrupting contacts, it becomes possible to have this dielectric liquid injected into the widening gap at the instant of zero current. The circuit breaker of my invention can thus be designed to give half-cycle operation, especially on currents in a low range and when the breaker starts to open in the first portion of the half cycle. While faster operation is possible if certain of the baffles of the present invention are eliminated or if the exit portions are not restricted, this is usually not desirable in view of the high transient voltages developed. However, if the arc is not interrupted at a point near the end of the half cycle, it will persist to a time represented by a point near the end of the succeeding half cycle and will be then interrupted.

Considerable difficulty has been experienced in existing circuit breakers in interrupting currents in a range from about 400 amperes to 6000 or 8000 amperes. In this range it has been found that the arcing time, contact burning, and oil carbonization greatly increase. However, above this range it has been found that the severity of these conditions decreased until at 25,000 amperes, or more, practically no difficulty is encountered. The explanation advanced has been that at the higher currents an effective magnetic blow-out action was obtained which facilitated interrupting the arc. The circuit breaker of the present invention is adapted to successfully interrupt any circuit and voltage up to its full rating.

In accomplishing this result the exit portions and the mouths of the various longitudinal passages are made progressively larger. Progressively larger quantities of dielectric liquid will thus be forced across the widening gap of the interrupting set of contacts. Thus, while relatively low-current arcs will be interrupted during the first portion of the movement of the contact 52 and while the gap is small, large-current arcs may persist until the gap is wider. It can be readily seen that the larger current will increase the cross-sectional area of the arc and will increase its ability to ionize and gasify greater quantities of dielectric liquid. In effect, a back-pressure will occur at the interrupting contacts which will reduce the rate of dielectric flow. In order that the rate of flow through the arc is not cut down due to this back-pressure, the exit portions should be larger for the larger currents. While it is not practical to have the openings or exit portions vary in size with the current, it is possible to have a series of exit portions progressively increasing in size and which will be available as the movable contact progressively uncovers the corresponding longitudinal passages. Thus, the arc will very quickly come adjacent an opening of the proper size for interruption.

The velocity of the movable contacts controls in part the characteristics of the breaker and can be changed for breakers of different rating. For instance, if the movable contact 52 clears several of the mouths of the longitudinal passages within a half cycle the breaker will clear the circuit at a point near the end of the half cycle. Slower movement of the contact 52 may allow the arc to persist to the next half cycle, especially on heavy currents, in which event the arc will continue until near the end of this succeeding half cycle.

It will be clear, however, that the invention is not limited to a structure in which the exit portions or the mouths of the various longitudinal passages are of progressively-increasing cross-sectional area. Successful results can be obtained if these exit portions are all of the same size. The same is true with regard to the mouths of the longitudinal passages. Nor is it always necessary to utilize slots in the baffles 80 to 87, nor in the auxiliary baffles. In some instances, these auxiliary baffles may be entirely dispensed with, though a much superior operation is obtained if they are present. Nor is it necessary to use the large number of longitudinal passages shown. In the simpler breakers two or more of these passages can be successfully used.

Similarly, with regard to the generating contacts, it is not always necessary to the invention to use the intermediate baffles disclosed, or the pockets 150, though superior results accrue from such use. Further, the general concept of successively jetting dielectric liquid into the gap between the interrupting contacts is not limited to the use of arc-generated streams of such dielectric liquid. Any means for thus successively jetting dielectric liquid into the widening gap falls within the scope of the present invention.

Nor is it necessary to the invention that two sets of interrupting contacts on opposite sides of the set of generating contacts be utilized. Such a construction is very convenient, but, if desired, the longitudinal passages and baffles extending to the left of the generating contacts, as viewed in Fig. 6, can be dispensed with, and the tube 38 properly closed to prevent any leftward flow. Further, the arc-extinguishing structures of the present invention find utility in various types of switches, and the invention is not limited to the particular type shown, nor to the operating mechanism disclosed.

As an illustration of a modified and simplified form of the invention, Figs. 13 to 18 disclose a structure incorporating many of the features hereinbefore described.

Referring particularly to these figures, I have shown an arc-extinguishing structure 200 including a tube of insulating material 201 with end members 202 and 203 detachably connected thereto.

The space inside the tube 201, between these end members, is divided into longitudinal passages 205, 206, and 207 by baffles 208 and 209 which are in the form of flat plates of insulating material.

The tube 200 provides openings 212, 212', and 212" which correspond to the openings 39, 39', and 39" previously described. These openings function to receive the primary contacts in a manner previously described. The tube 200 also provides oppositely-disposed openings 213, 213', and 213" serving the same function as the openings 48, 48', and 48" previously described. The baffles 208 and 209 provide openings in alignment with the openings of the tube 200, these openings being indicated by the numeral 214.

I prefer to make the entire internal structure removable as a unit. In this capacity I have shown the baffles 208 and 209 mounted in two spacer structures best shown in Fig. 18. Each of these structures includes two spacer members 215 with arcuate surfaces corresponding to the internal surface of the tube 200. Each spacer member provides notches 216 and 217 for receiving the baffles 208 and 209, and corresponding notches 218 and 219 are provided in these baffles so that the baffles and spacer members interlock when in assembled position.

Figure 17:
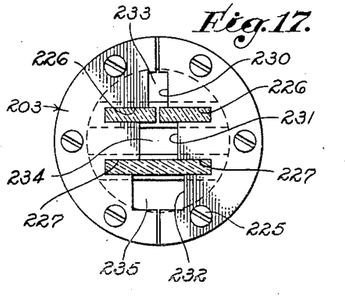
Figure 18:
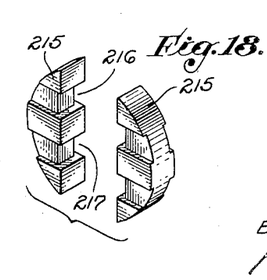
Fig. 18 is a perspective view of two of the spacer members utilized in the form of arc-quenching structures shown in Figs. 13 to 17.

Each of the end members 202 and 203 is formed in two head sections as best indicated in Fig. 17, these sections being suitably secured to the tube 200 as by bolts 225. Each head section provides a notch 226 receiving a correspondingly-notched portion of the baffle 208. So also, each head section provides a corresponding notch 227 receiving a notched portion of the baffle 209. The baffles and the end members are thus interlocked when in assembled position.

In addition, each head section of the end members provides cut-away portions 230, 231, and 232. The cut-away portions 230 cooperate in providing an exit means 233 restricting outward flow from the longitudinal passage 205. Similarly, the cut-away portions 231 cooperate in defining an exit portion 234 communicating and throttling the flow from the longitudinal passage 206. A similar exit portion 235 is formed by corresponding cut-away portions 232 and throttles flow from the longitudinal passage 207. These exit portions 233, 234, and 235 are shown as progressively increasing in cross-sectional area in the order named, though it will be clear that they can be made of the same size if desired.

One or both of the baffles 208 and 209 may provide suitable slots receiving the arcs. In this capacity the baffle 208 is shown as providing slots 240 extending outward from the openings 214 to a position beyond the end members 203. Auxiliary pockets corresponding to the pockets 150 may be provided adjacent the generating set of electrodes, if desired, though in the simplified form shown in Figs. 13 to 18, these pockets are omitted, the longitudinal passages themselves serving in the capacity of retaining dielectric liquid adjacent the arc between the generating set of contacts.

The operation of this form of the invention is substantially the same as that previously described. If the interrupting sets of contacts are first separated, a momentary high pressure will be built up around the generating set of electrodes so that when the arc forms therebetween, the gas bubble is confined to secure greater vaporization and confinement of the gas bubble as formed. The movable contacts clear the openings 214 of the baffles in succession, and move at corresponding rates. Streams or jets of dielectric liquid are thus forced outward in the longitudinal passages in succession and into the widening gap between each set of interrupting contacts. As the movable contacts clear the openings 214 of the baffles 208, the arc is thus forced outward into the slots 240 in a manner previously described. Progressively-larger exit portions 233, 234, and 235 permit successively greater quantities of dielectric liquid to be forced between the separating interrupting contacts to more effectively break the larger currents.

It will be clear that various modifications can be made in the invention without departing from the spirit thereof. So also, it will be clear that the invention includes various novel sub-combinations which are of utility irrespective of their use in combination with the features of the complete embodiment.

I claim as my invention:

1. In combination in a high voltage circuit breaker for interrupting a power circuit, relatively movable contacts separable to form an arc gap, an arc-extinguishing liquid, a source of pressure for causing a continuous series of jets of said liquid to traverse in succession said arc gap in accordance with the circuit-opening operation, and means for directing said jets transversely through said arc gap so that the initial jet of liquid is of such cross-sectional area as substantially to fill the gap existing at that instant and the following jets are of progressively larger cross-sectional area so as substantially to fill the further lengthened gap.

2. In combination in a high voltage circuit breaker for interrupting a power circuit, relatively movable contacts separable to form an arc gap, an arc-extinguishing liquid in which said contacts are immersed, means apart from the arc formed in said gap for producing a series of pressure surges in close succession in said liquid in accordance with the circuit-opening operation, and means for directing liquid under influence of said surges in unidirectional jet-like flow across said arc gap, said series of pressure surges occurring within the time necessary to separate said contacts a preferred interrupting distance.

3. In combination in a high voltage circuit breaker for interrupting a power circuit, relatively movable contacts separable to form an arc gap, means defining a plurality of longitudinal passages each leading to said arc gap, an arc-extinguishing liquid filling said passages, means for producing in succession pressure impulses which are communicated to said longitudinal passages respectively for forcing said liquid in unidirectional jet-like flow along said passages into said gap to traverse the same in accordance with the circuit-opening operation, said pressure impulse producing means being apart from the arc formed in said gap.

4. In combination in a high voltage circuit breaker for interrupting a power circuit, relatively movable contacts separable to form an arc gap, means defining a plurality of longitudinal passages leading to said arc gap, an arc-extinguishing liquid in said passages, and impelling means apart from the arc formed in said gap for creating pressure surges in each of said longitudinal passages in succession to cause unidirectional jet-like flow of liquid from said passages to traverse said arc gap in successive steps in accordance with lengthening thereof.

5. In combination in a high voltage circuit circuit breaker for interrupting a power circuit, relatively movable contacts separable to form an arc gap, means defining a plurality of longitudinal passages leading to said arc gap, an arc-extinguishing liquid filling said passages, one of said contacts arranged successively to uncover exhaust portions of said passages in accordance with the circuit-opening operation, said contact impeding liquid flow from a passage when in position opposite the exhaust portion thereof, and means apart from the arc formed in said gap timed with relation to the movement of said contact for creating pressure in said passages in sequence to correspond with the clearance of the corresponding exhaust portions by said contact whereby liquid is forced in unidirectional jet-like flow from said passages to traverse in successive stages said arc gap.

6. In combination in a high voltage circuit breaker for interrupting a power circuit, an arc-extinguishing liquid, relatively movable contacts separable to form an interrupting arc, additional relatively movable contacts separable to form a pressure-generating arc, and insulating structure immersed in said liquid defining a plurality of passages leading from said pressure-generating arc to said interrupting arc, said passages extending transversely of said arcs and spaced along the longitudinal axes thereof, said insulating structure also defining along the path of said pressure-generating arc a series of small liquid-containing pockets alternating with said passages for supplying successively to said pressure-generating arc small quantities of liquid whereby a series of pressure surges are created in close succession in said passages to produce unidirectional jet-like flow across said interrupting arc as said arc is lengthened.

7. In combination in a high voltage circuit breaker for interrupting a power circuit, an arc-extinguishing liquid, relatively movable contact structure separable to form two interrupting arcs, additional contact structure separable to form a pressure-generating arc intermediate said interrupting arcs, and insulating structure within which said arcs are drawn immersed in said liquid, said insulating structure defining a passage communicating respectively with said pressure-generating arc and said interrupting arcs to exhaust beyond said interrupting arcs, and means for causing separation of said first-named contact structure prior to separation of said additional contact structure for causing a momentary increase of liquid pressure in said passage in the region of said pressure-generating arc.

8. In combination in a high-voltage circuit breaker for interrupting a circuit: a set of interrupting contacts connected in said circuit and separable to form an arc gap; a set of pressure generating contacts spaced from said set of interrupting contacts and separable to form an arc therebetween; a structure extending between said sets of contacts and containing a dielectric liquid in which said arcs are formed; baffle means in said structure extending from a position adjacent said set of generating contacts to a position adjacent said set of interrupting contacts and providing a continuous series of longitudinal passages conducting dielectric liquid from the generating contacts to the interrupting contacts; and means for separating the contacts of said sets whereby the arc formed between said generating contacts vaporizes a portion of said dielectric liquid to force streams of said dielectric liquid in unidirectional jet-like flow along said longitudinal passages into the arc formed between said interrupting electrodes.

9. In combination in a high-voltage circuit breaker for interrupting a circuit: a set of interrupting contacts connected in said circuit and separable to form an arc gap; a set of pressure generating contacts surrounded by a dielectric liquid and separable to form an arc therebetween which tends to vaporize an adjacent portion of said dielectric liquid to form a gas bubble through which said arc persists, formation of said gas bubble quickly increasing the pressure adjacent said generating set of contacts and forcing dielectric liquid from the vicinity thereof; means conducting the dielectric liquid thus forced from this vicinity into the gap between the contacts of said interrupting set of contacts during the period of arc existence therebetween; and means for feeding a continuous series of successive additional quantities of dielectric liquid to said arc between said contacts of said generating set of contacts, thereby continuing the gas generation adjacent said generating set of electrodes to continue unidirectional flow of dielectric liquid into the gap between the contacts of said interrupting set of electrodes.

10. In combination in a high-voltage circuit breaker for interrupting a circuit: a set of interrupting contacts connected in said circuit and separable to form a gap which is traversed by an arc between said contacts during at least a part of the separating movement; a set of generating contacts spaced from said set of interrupting contacts and separable to form an arc therebetween; a surrounding structure extending between said sets of contacts and containing a dielectric liquid in which said arcs form; and means for momentarily increasing the pressure adjacent said generating set of contacts just before arc formation therebetween, said means including means for first opening said set of interrupting contacts and then opening said set of generating contacts.

11. In combination in a high-voltage circuit breaker for interrupting a circuit: a set of interrupting contacts connected in said circuit and separable to form a gap which is traversed by an arc between said contacts during at least a part of the separating movement; and means for progressively introducing into said gap as it widens streams of dielectric liquid of progressively greater cross-sectional size.

12. In combination in a high-voltage circuit breaker for interrupting a circuit: a plurality of baffles spaced from each other to define longitudinal passages providing mouths of progressively larger cross-sectional size in a given direction; a set of interrupting contacts for successively drawing an arc adjacent said mouths and including a movable electrode movable in said given direction whereby a gap is formed when the contacts of said set separate, said gap progressively communicating with said mouths of larger cross-sectional size; and means for forcing streams of dielectric liquid through said mouths into said gap whereby streams of larger cross-sectional size are delivered to said gap as said arc is drawn out.

13. A combination as defined in claim 12 in which each of said longitudinal passages provide an exit portion beyond said mouths and said gap, said exit portions correspondingly increasing in size, the larger exit portions communicating with the mouths of larger cross-sectional size.

14. In combination in a high-voltage circuit breaker for interrupting a circuit: a plurality of baffles providing aligned openings defining a first contact-receiving space and providing other aligned openings defining a second contact-receiving space, said baffles being spaced from each other to define longitudinal passages communicating with said spaces and containing dielectric liquid; a set of generating contacts including a movable contact in said first contact-receiving space; a set of interrupting contacts connected in said circuit and including a movable contact in said second contact-receiving space; means for moving said movable contacts to form arcs between the contacts of said generating set and between the contacts of said interrupting set, the arc between the contacts of said generating set successively vaporizing portions of said dielectric liquid in said longitudinal passages as it is drawn out in said first contact-receiving space to force streams of dielectric liquid along said longitudinal passages to said arc between said contacts of said interrupting set; and means restricting discharge from the ends of said longitudinal passages.

15. In combination in a high-voltage circuit: a plurality of baffles providing aligned openings defining a first contact-receiving space and providing other aligned openings defining a second contact-receiving space, said baffles being spaced from each other to define longitudinal passages communicating with said spaces and containing dielectric liquid; a set of generating contacts including a movable contact in said first contact-receiving space; a set of interrupting contacts connected in said circuit and including a movable contact in said second contact-receiving space; means for moving said movable contacts to form arcs between the contacts of said generating set and between the contacts of said interrupting set, the arc between the contacts of said generating set successively vaporizing portions of said dielectric liquid in said longitudinal passages as it is drawn out in said first contact-receiving space to force streams of dielectric liquid along said longitudinal passages to said arc between said contacts of said interrupting set to force this arc toward the ends of said longitudinal passages; and walls forming narrow slots opening on said second contact-receiving space and extending toward the ends of said longitudinal passages for receiving the arc between the contacts of said interrupting set.

16. A combination as defined in claim 15 including auxiliary baffles in said longitudinal passages and providing said slots, each of said auxiliary baffles providing an arc-splitting edge at the end of the corresponding slot whereby said arc is forced into said slot and held against said edge while being deformed on opposite sides of said auxiliary baffle by outward flow through the longitudinal passage in which the auxiliary baffle is positioned.

17. In combination in a high-voltage circuit breaker for interrupting a circuit: a set of interrupting contacts connected in said circuit and separable to form an arc gap; walls defining a plurality of longitudinal passages communicating with said gap, said passages normally containing dielectric liquid; means for developing pressure in said longitudinal passages in timed sequence to discharge in unidirectional jet-like flow said dielectric liquid along the passages and into said gap; and means for restricting the exhaust portions of each of said longitudinal passages for throttling flow therealong, thereby favoring prolongation of flow from one passage until flow begins in the next passage.

18. In combination in a high-voltage circuit breaker for interrupting a circuit: a set of generating contacts; a set of interrupting contacts, said contacts being immersed in a dielectric liquid; means to open said sets of contacts to form a generating arc and an interrupting arc; and walls providing a plurality of passages having portions extending between said sets of contacts and discharge portions extending beyond said interrupting contacts, at least one of said passages having its discharge portion restricted relative to its portion between the sets of contacts to favor compression of gas produced at the generating set of contacts by back-pressure from gas produced at the interrupting set of contacts.

19. In combination in a high-voltage circuit breaker for interrupting a circuit: a set of generating contacts; a set of interrupting contacts, said contacts being immersed in a dielectric liquid; an arc-quenching member providing a plurality of passages having portions extending between said sets of contacts and discharge portions extending beyond said interrupting set of contacts; and means to open said generating contacts and said interrupting contacts to form a generating arc and an interrupting arc, said means being adapted to open the interrupting set in advance of the generating set to provide pressure in said passages in the vicinity of the generating contacts prior to opening of the generating contacts, thereby favoring compression of gas formed by said generating arc, at least one of said passages having its discharge portion restricted relative to its portion extending between the sets of contacts, whereby to further favor compression of the gas produced by said generating arc.

20. In combination in a high-voltage circuit breaker for interrupting a circuit: a set of generating contacts; a set of interrupting contacts, said contacts being immersed in a dielectric liquid; means to open said sets of contacts to produce a generating arc and an interrupting arc; an arc-quenching member having a contact passageway to accommodate the opening movement of said generating set of contacts; walls in said arc-quenching member providing a plurality of passages opening on said contact passageway and leading toward the interrupting set of contacts; and walls in said arc-quenching member providing a plurality of pockets opening on said contact passageway, said passages and pockets being arranged along said contact passageway to be opened to said contact passageway in succession by the opening movement of said interrupting contacts, said pockets being interspersed with respect to said passages whereby dielectric fluid released from the pockets to the generating arc will cause spurts in pressure in neighboring passages subsequent to the initial pressure surges in said passages caused by the action of the generating arc on the oil in said passages.

21. In combination in a high-voltage circuit breaker for interrupting a circuit: a set of generating contacts; a set of interrupting contacts, said contacts being immersed in a dielectric liquid; means to open said sets of contacts to produce a generating arc and an interrupting arc; an arc-quenching member having a contact passageway to accommodate the opening movement of said generating set of contacts; walls in said arc-quenching member providing a plurality of passages opening on said contact passageway and leading to the interrupting set of contacts; and walls in said arc-quenching member providing a plurality of pockets opening on said contact passageway, said passages and pockets being arranged along said contact passageway to be opened to said contact passageway in succession by the opening movement of said interrupting contacts, said pockets being interspersed with respect to said passages whereby dielectric fluid released from the pockets to the generating arc will cause spurts in pressure in neighboring passages subsequent to the initial pressure surges in said passages caused by the action of the generating arc on the oil in said passages, said passages being restricted near the interrupting set of contacts to favor prolongation of flow in one passage until flow begins in the next passage.

22. In combination in a high-voltage circuit breaker for interrupting a circuit: a set of generating contacts; a set of interrupting contacts, said contacts being immersed in a dielectric liquid; means to open said sets of contacts to form a generating arc and an interrupting arc; and an arc-quenching member providing passage means extending between said sets of contacts and beyond said interrupting contacts, said passage means beyond the interrupting contacts having slots to receive and restrict the interrupting arc.

23. In combination in a high-voltage circuit breaker for interrupting a circuit: a set of generating contacts; a set of interrupting contacts, said contacts being immersed in a dielectric liquid; means to open said sets of contacts to produce a generating arc and an interrupting arc; an arc-quenching member having a contact passageway to accommodate the opening movement of said interrupting set of contacts; passage means in said arc-quenching member for directing fluid flow from the vicinity of the generating arc to said contact passageway; and walls in said arc-quenching member providing a plurality of discharge passages extending from said contact passageway, there being slots in said walls opening on said passageway to permit the interrupting arc to curve away from the generating arc out of the contact passageway.

24. In combination in a high-voltage circuit breaker for interrupting a circuit: a set of generating contacts; a set of interrupting contacts, said contacts being immersed in a dielectric liquid; means to open said sets of contacts to produce a generating arc and an interrupting arc; an arc-quenching member having contact passageways to accommodate the opening movements of both said sets of contacts; and walls in said arc-quenching member providing a plurality of passages having intermediate portions between said contact passageways and discharge portions beyond the contact passageway associated with the interrupting contacts, said intermediate portions of said passages being restricted to less than the width of said interrupting contacts whereby said interrupting contacts serve as valves controlling said passages and whereby flow discharged into the interrupting arc will be accelerated, said discharge portions of said passages being also restricted to less than the width of the contacts, thereby maintaining the velocity of flow beyond the interrupting contacts and restricting the lateral freedom of the interrupting arc.

25. In combination in a high-voltage circuit breaker for interrupting a circuit: a set of generating contacts; a set of interrupting contacts, said contacts being immersed in a dielectric liquid; means to open said sets of contacts to produce a generating arc and an interrupting arc; an arc-quenching member having contact passageways to accommodate the opening movements of both said sets of contacts; and walls in said arc-quenching member providing a plurality of passages having intermediate portions between said contact passageways and discharge portions beyond the contact passageway associated with the interrupting contacts, said intermediate portions of said passages being restricted to less than the width of said interrupting contacts whereby said interrupting contacts serve as valves controlling said passages and whereby flow discharged into the interrupting arc will be accelerated, said discharge portions of said passages being also restricted to less than the width of the contacts, thereby maintaining the velocity of flow beyond the interrupting contacts and restricting the interrupting arc, the portions of said walls separating the discharge portions of said passages being provided with slots to restrict the interrupting arc.

26. In combination in a high-voltage circuit breaker for interrupting a circuit: a set of generating contacts; a set of interrupting contacts, said contacts being immersed in a dielectric liquid; means to open said sets of contacts to produce a generating arc and an interrupting arc; an arc-quenching member having a contact passageway to accommodate the opening movement of said interrupting set of contacts; passage means in said arc-quenching member for directing fluid flow from the vicinity of the generating arc to said contact passageway; and walls in said arc-quenching member providing a plurality of discharge passages extending from said contact passageway, there being slots in said walls opening on said passageway to permit the interrupting arc to curve away from the generating arc out of the contact passageway, at least some of the slots terminating in relatively thin arc-splitting edges in said walls.

FRED H. COLE.